United States Patent
Carter et al.

(10) Patent No.: US 7,504,355 B2
(45) Date of Patent: Mar. 17, 2009

(54) SUPPORTED METAL CATALYST WITH IMPROVED THERMAL STABILITY

(75) Inventors: Emily A. Carter, Los Angeles, CA (US); Emily A. Jarvis, Arlington, VA (US)

(73) Assignee: Princeton University, Princeton, NJ (US)

( * ) Notice: Subject to any disclaimer, the term of this patent is extended or adjusted under 35 U.S.C. 154(b) by 717 days.

(21) Appl. No.: 10/518,129

(22) PCT Filed: Jun. 12, 2003

(86) PCT No.: PCT/US03/18857

§ 371 (c)(1),
(2), (4) Date: Dec. 14, 2004

(87) PCT Pub. No.: WO04/000454

PCT Pub. Date: Dec. 31, 2003

(65) Prior Publication Data

US 2005/0233896 A1  Oct. 20, 2005

(51) Int. Cl.
| | |
|---|---|
| B01J 23/00 | (2006.01) |
| B01J 23/56 | (2006.01) |
| B01J 23/44 | (2006.01) |
| B01J 23/42 | (2006.01) |
| B01J 21/04 | (2006.01) |
| B01J 32/00 | (2006.01) |

(52) U.S. Cl. ............ 502/300; 502/332; 502/333; 502/334; 502/335; 502/337; 502/339

(58) Field of Classification Search .......... 502/335
See application file for complete search history.

(56) References Cited

U.S. PATENT DOCUMENTS

| | | | |
|---|---|---|---|
| 3,966,790 A | 6/1976 | Hindin et al. | |
| 4,171,288 A | 10/1979 | Keith et al. | |
| 4,294,726 A | 10/1981 | Bozon et al. | |
| 4,559,364 A | * 12/1985 | Wood et al. | ............ 518/715 |
| 4,624,940 A | 11/1986 | Wan et al. | |
| 4,714,694 A | 12/1987 | Wan et al. | |
| 4,849,399 A | 7/1989 | Joy, III et al. | |
| 4,902,664 A | 2/1990 | Wan | |
| 5,212,142 A | 5/1993 | Dettling | |

(Continued)

OTHER PUBLICATIONS

Jarvis et al., An Atomic Perspective of a Doped Metal-Oxide Interface, J. Phys. Chem B, 2002, 106, 7997-8004 (published on Web Jun. 14, 2002).

(Continued)

*Primary Examiner*—Jerry Lorengo
*Assistant Examiner*—Kevin M Johnson
(74) *Attorney, Agent, or Firm*—Duane Morris LLP

(57) ABSTRACT

Catalytic systems are provided that include a metallic catalyst attached to a ceramic support that has alumina as a principal ingredient. The ceramic support is doped with an adhesive agent so that the surface of the support includes the adhesive agent. The adhesive agent is designed to form an open-shell electronic structure at the interface between the metallic catalyst and the support. The open-shell structure promotes extended useful catalyst lifetimes. The adhesive agents are early transition metals that include titanium, zirconium, scandium, hafnium, lanthanum and yttrium. Doping of the ceramic support surface with the adhesive agent also increases the adhesion between the ceramic support and metallic monoliths to which the ceramic support may be attached.

21 Claims, 1 Drawing Sheet

U.S. PATENT DOCUMENTS

| | | | |
|---|---|---|---|
| 5,512,324 A * | 4/1996 | Paulus et al. | 427/409 |
| 5,552,360 A | 9/1996 | Farrauto et al. | |
| 5,559,065 A * | 9/1996 | Lauth et al. | 502/5 |
| 5,627,124 A | 5/1997 | Farrauto et al. | |
| 6,492,297 B1 | 12/2002 | Sung | |
| 6,566,573 B1 * | 5/2003 | Bharadwaj et al. | 585/658 |

OTHER PUBLICATIONS

Jarvis et al., Importance of open-shell effects in adhesion at metal-ceramic interfaces, Physical Review B 66, 100103(R) (2002) (published Sep. 25, 2002).

* cited by examiner

SUPPORTED METAL CATALYST WITH IMPROVED THERMAL STABILITY

This invention was made with Government support under Grant No. F49620-00-1-0054, awarded by the Air Force Office of Scientific Research. The Government has certain rights in this invention.

BACKGROUND OF THE INVENTION

1. Field of the Invention

The present invention relates generally to catalytic systems in which metal catalysts are attached to an oxide ceramic support which is in turn supported on a monolith structure. More particularly, the present invention involves improving such catalytic systems by increasing the adhesion between the metal particles and the ceramic support and/or increasing the adhesion between the ceramic support and the monolith structure. This increase in adhesion extends the useful catalytic lifetime of the system.

2. Description of Related Art

Metallic catalysts are used in large numbers of systems to catalyze a wide variety of chemical reactions. For example, nickel is used to catalyze methanation reactions where natural gas is created from carbon monoxide and hydrogen. Palladium is widely used in catalytic converters for automobile exhaust systems. Palladium is also used as a hydrogenation catalyst in numerous processes for creating a wide variety of specialty chemicals including alcohols, polymers, and food products. Platinum is also a popular metal catalyst that is used extensively in oil refining and fuel cells. Platinum has also been used widely in catalytic converters for exhaust systems.

Catalysts that promote the oxidation of unburned hydrocarbons and carbon monoxide, as well as reducing nitrogen oxides, have been widely used in treating the exhaust gas streams of internal combustion engines. Such catalysts are referred to as "three-way" conversion catalysts (TWC). TWC catalysts typically include various combinations of platinum, palladium and rhodium that are located on high surface area ceramic supports that are composed of one or more refractory oxides.

It is important in any catalytic system that the surface area of metallic catalyst that is exposed to the reactants be maximized. One way to obtain relatively large surface area exposure is to use metallic catalysts that are in the form of small particles. The catalytic particles are usually immobilized on the ceramic or refractory oxide support material. Ceramic supports that utilize alumina as the principal refractory oxide have been very popular. The ceramic supports are typically provided as powders that are coated onto a macro sized carrier particle or other type of monolithic supporting structure. Monolithic support structures are made from a wide variety of materials including ceramic and metal materials.

An important consideration in heterogeneous catalytic systems that combine ceramic supports with metal particles is to insure that the exposed surface area of the metal catalyst does not diminish over time. This is especially important for catalytic systems that operate at high temperatures and utilize small metallic particles attached to a ceramic support. Sintering tends to occur in these types of systems that results in agglomeration of the particles and substantial reductions in exposed metallic surface areas. This reduction in exposed surface area substantially reduces the activity of the catalyst particles and results in decreased lifetime of the catalytic system. In addition, it is important that the ceramic support remain firmly attached to the monolith structure. This is a particular problem when the ceramic support is attached to a metallic monolith.

Numerous attempts have been made over the years to maintain high exposure of metallic catalyst surface area. Most of these attempts have focused on modifying the properties of the ceramic support to "stabilize" the support and prevent occlusion of the metallic catalyst. For example, U.S. Pat. No. 4,171,288 describes stabilizing alumina supports by adding zirconia, titania, alkaline earth metal oxides, such as baria, calcia or strontia or rare earth metal oxides, such are ceria, lanthana and mixtures of two or more rare earth metal oxides. Other examples of alumina supports that have been modified to increase activity and durability are described in U.S. Pat. Nos. 3,966,790; 4,294,726; 4,624,940; 4,714,694; 4,849,399; 4,902,664; 5,212,142; 5,552,360; 5,627,124; and 6,492,297. The contents of the preceding patents are hereby specifically incorporated by reference.

Although many of the above catalytic systems work well for their intended purposes, there is a continuing need to develop new systems and methods that can be used in a wide variety of heterogeneous metallic catalyst systems to maintain high catalytic metal surface areas and good adhesion between the ceramic support and underlying monolith.

SUMMARY OF THE INVENTION

In accordance with the present invention, it was discovered that adhesion of metal catalyst particles to a ceramic support can be increased by doping the interface between the ceramic support and the metal catalyst particles with one or more adhesive agents that include early transition metals in their elemental or suboxide form. This increase in adhesion suppresses sintering of the particles and results in prolonged useful catalyst lifetimes when the catalysts are used in a non-oxidizing atmosphere. In addition, it was discovered that the same adhesive agent can be used to increase the adhesion between the ceramic support and metal monoliths regardless of the oxidizing or non-oxidizing nature of the atmosphere in which the catalyst is used.

The present invention is directed to catalytic systems that include an oxide ceramic support that has alumina as a principal ingredient. The ceramic support is doped with an adhesive agent so that the surface of the support includes the adhesive agent. The adhesive agent is designed to form an open-shell electronic structure at the interface between the catalyst particles and the support. It is believed that this open-shell electronic structure at the interface increases the adhesion between the particles and the support and reduces sintering.

The adhesive agents that promote an open-shell electronic structure at the particle-support interface include titanium, zirconium, scandium, hafnium, yttrium and lanthanum. The adhesive agents are present as a reduced metal or suboxide and not as an oxide. Metal catalysts, such as nickel, palladium and platinum, all have nearly closed shell electronic structures and alumina is a highly ionic material. In accordance with the present invention, this closed shell/ionic interface is modified with adhesive agents to be more open-shell/covalent in nature to increase adhesion. Titanium, zirconium, scandium, hafnium, yttrium, and lanthanum are adhesive agents that all have an open-shell electronic structure.

The present invention may be used to prolong useful catalyst lifetime of any heterogeneous catalyst systems where a metal-ceramic interface exists. The invention involves doping the support or otherwise introducing relatively small amounts of one or more adhesive agents so that they are present at the particle-support interface. The adhesive agent(s) does not completely cover the support surface. The adhesive agent(s) is typically present as a ¼ to ¾ monolayer at the support surface. This level of doping provides a sufficient open-shell electronic structure to increase bonding of the metal particles to the support without otherwise deleteriously affected the catalytic properties of the metal catalyst particles. The catalyst is intended for use in a non-oxidizing atmosphere in order to avoid completely oxidizing the reduced metal or suboxide form of the adhesive agent.

The present invention also includes modifying the interface between the ceramic support and metal monolith with the same adhesive agents that are used to treat the catalyst/ceramic support interface. This results in an increase in the adhesion between the two heterogenous materials. Such catalyst systems are suitable for use in both oxidizing and non-oxidizing atmospheres because the adhesive agents are substantially shielded by the ceramic support.

The above discussed and many other features and attendant advantages of the present invention will become better understood by reference to the detailed description when taken in conjunction with the accompanying drawings.

DETAILED DESCRIPTION OF THE INVENTION

Figure 1:
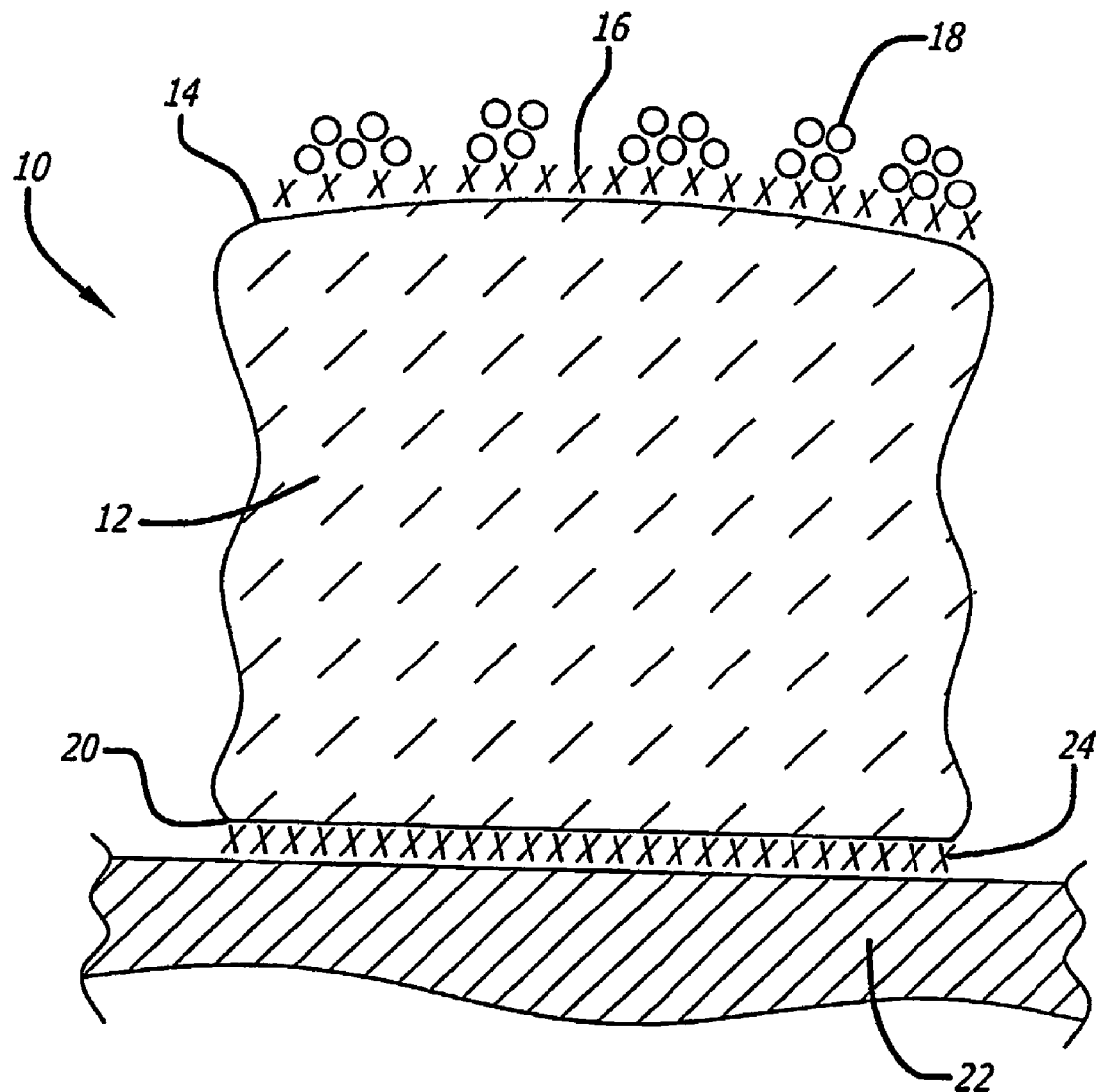
FIG. 1 is a pictorial representation of an exemplary metal-supported ceramic catalyst system in accordance with the present invention.

An exemplary catalytic system in accordance with the present invention is shown generally at 10 in FIG. 1. The system 10 includes a ceramic support 12 that has a surface 14. An adhesive agent, represented by the X's 16, is located at the surface 14. Metal catalyst particles 18 are attached to the support surface 14. The metal catalyst particles 18 are shown as being formed by groupings of metal atoms that are represented by the circles. The ceramic support 12 also has a surface 20 that is attached to monolith 22. An adhesive agent, represented by the X's 24, is also located at the surface 20. The system is a conventional heterogeneous metal-ceramic catalyst system except that the adhesive agent is used to dope the metal-ceramic interfaces to promote an open-shell electronic structure that increases adhesion between the metal and ceramic. The system 10 shown in FIG. 1 includes doping with adhesive agent 16 and 24 at both the metal catalyst/ceramic support interface and the metal monolith/ceramic support interface, respectively. Doping at both interfaces is preferred when the catalyst is intended for use in a non-oxidizing atmosphere and includes a metal monolith. When the catalyst is intended for use under oxidizing conditions, the doping of the metal catalyst/ceramic support interface may be deleted. In addition, if the monolith is a ceramic material, then doping of the ceramic support/ceramic monolith may be deleted, if desired.

The metallic catalyst particles can be made from any of the metals that are known for use as catalysts. Nickel, palladium and platinum are examples of metals that are widely used to form catalyst particles. Other metals that can be used include rhodium, ruthenium, iridium and cobalt. Nickel, palladium and platinum are preferred metals. The particles will vary widely in size and shape depending upon the particular system and the size of the ceramic support particles. For most catalytic systems, the particles will have sizes that are significantly less than the size of the ceramic support particles that are typically less than 40 mesh (hole openings of 0.0165 inch) and preferably less than 325 mesh (hole openings of 0.0017 inch). Catalyst particles containing combinations of metals are also suitable. The invention may be used to increase the adhesion of metal catalyst particles and metal monoliths to ceramic surfaces in a wide variety of known catalytic systems including: catalytic converters (TWC systems); catalytic systems that promote chemical reactions, such as reduction, methanation, steam reforming of hydrocarbons; catalytic systems that promote oxidation of carbonaceous materials; and hydrogenation of unsaturated hydrocarbons and polymers.

The ceramic support can be made from substantially pure alumina (at least 99.5 weight percent pure) or any of the known combinations of alumina and other refractory and metal oxides. It is preferred, although not required, that the alumina be stabilized with one or more refractory or metal oxides. See for example U.S. Pat. Nos. 4,171,288; 3,966,790; 4,294,726; 4,624,940; 4,714,694; 4,849,399; 4,902,664; 5,212,142; 5,552,360; 5,627,124; and 6,492,297. The ceramic support will typically contain a major amount of one or more finely divided aluminum oxide forms. The alumina should be in activated or calcined form, such as gamma, delta, theta, kappa or eta phases. The alumina will generally have a BET surface area in excess of 60 square meters per gram. Surface areas of up to 200 square meters and more are possible and routinely found in the art. The activated alumina is usually a mixture of the gamma and delta phases and may also contain substantial amounts of eta, kappa and theta alumina phases. The size of the ceramic support particles will typically be less than 40 mesh and preferably less than 325 mesh. The ceramic support may also be in the form of a coating on the monolith structure. The ceramic support is applied to the monolith by liquid or vapor deposition, for example, to form a support surface onto which the metallic catalyst is applied.

The ceramic support may include refractory and metal oxides other than activated alumina. For example, silica is a preferred refractory oxide that is preferably included at the surface of the ceramic support. It is preferred that the silica, when present, should constitute a ¼ to ¾ monolayer on the support surface. Exemplary metal oxides include ceria, zirconia, chromia and titania. These metal oxides are known to be stabilizing agents that have been widely used in combination with alumina to form ceramic supports. The amount of alumina in the ceramic support should be on the order of 75 weight percent and higher. In general, the invention may be used in connection with any catalyst support that contains alumina at the surface of the support as a principal ingredient. To be a principal ingredient, the alumina should be present in an amount that constitutes at least 25 percent of the surface area of the support.

As an aspect of the present invention, the surface of the ceramic support is treated with an adhesive agent prior to addition of the metallic catalyst. The adhesive agents are early transition metals such as of titanium, zirconium, scandium, hafnium, yttrium, and lanthanum. The adhesive agents are applied to the support surface as reduced metals or suboxides and they preferably remain largely that way during use. The adhesive agents are not applied as salts that can be easily converted into oxides nor are they otherwise treated to form the corresponding oxides. The adhesive agents are applied by vapor deposition or other suitable technique that produces a submonolayer of early transition metal on the support surface. Such other techniques include doping with organometallic complexes that can be reduced by hydrogenation. It is preferred that the adhesive agent be applied as the reduced metal. However, suboxide forms of the adhesive agent may be used. For example, titanium in metallic form or as the suboxide $TiO_x$ ($x<2$) may be used as the adhesive agent. Some oxidation of the adhesive agent may occur without causing adverse effects. However, it is preferred to limit oxidation of the adhesive agents when possible. Suboxide forms of the adhesive agent are any oxide form that is less than the fully oxidized form of the transition metal.

The adhesive agent (early transition metal) should be applied to the support so that it does not cover the entire surface area of the support. It is only necessary that a sufficient amount of adhesive agent be applied to dope the interface between the metallic catalyst particle and the ceramic support and the interface between the ceramic support and the monolith. It is preferred that the adhesive agent be applied to provide a ¼ to ¾ monolayer of the early transition metal. Even more preferred is a $V_2$ monolayer of the adhesive agent. One monolayer represents a 1:1 ratio of atoms in the monolayer to atoms comprising the substrate surface. Accordingly, if the substrate has 4 atoms in the periodic unit cell of the surface, then one monolayer of adhesive agent will have 4 atoms of adhesive agent, while a ½ monolayer will have 2 atoms of adhesive agent in the surface unit cell. The adhesive agent should be deposited at a low enough temperature to avoid agglomeration of the adhesive agent into clusters. The adhesive agent should be fully dispersed into isolated atoms on the ceramic support.

It is preferred that the ceramic support be in the form of ceramic particles and that the adhesive agent be applied to the surface of the ceramic support. Application of the adhesive agent to the surface of the ceramic particle inherently provides early transition metal doping of both the metal catalyst/ceramic support and ceramic support/monolith interfaces. When the catalyst is used under oxidizing conditions, the activity of the adhesive agent at the metal catalyst/ceramic support may be reduced due to oxidation of the adhesive agent. However, the activity of the adhesive agent at the ceramic support/monolith interface should remain largely unaffected. In certain situations where larger scale ceramic supports are used, it may be desirable to dope the two interfaces with the same or different adhesive agents. Also, it may be desirable to dope one or the other interface. Also, as mentioned above, the ceramic support may be applied to the underlying monolith to form a ceramic support coating onto which the metallic catalyst is applied.

Titanium, zirconium, scandium, hafnium, lanthanum and yttrium are the preferred adhesive agents. Titanium, zirconium, yttrium and scandium are particularly preferred. They may be used alone or in combination. For example, the surface of the support can be doped with a ¼ monolayer of zirconium and a ¼ monolayer of titanium. Combinations of more than two adhesive agents are possible, provided that the total amount of adhesive agent does not exceed about a ¾ monolayer. Doping levels higher than a ¾ monolayer are possible provided that the other properties of the catalyst are not adversely affected. Doping levels lower than a ¼ monolayer are also possible provided that a sufficient amount of adhesive agent doping is provided to increase the adhesion at the metal catalyst/ceramic support and/or ceramic support/monolith interfaces.

After the adhesive agent has been applied to the support, the modified support is then combined with the metallic catalyst in accordance with known procedures. These procedures typically involve direct physical admixture of the metallic catalyst particles and the support particles or application of a solution containing the metallic catalyst. For example, transition metal salts are used and then reduced by hydrogenation. Also aqueous solutions of the transition metal amine hydroxide have also been used. The mixture of alumina support and catalyst metal is many times heated in a non-oxidizing atmosphere to obtain the final catalyst.

The exact procedures by which the ceramic support and catalytic metals are made and combined may vary considerably and are not particularly critical with respect to practicing the present invention. The important thing, as required by the present invention, is that the interface between the surface of the ceramic support and the surface of the metallic catalyst and/or monolith must be doped with an adhesive agent as set forth above.

Once the metal catalyst has been applied to the support particles, the resulting catalytic powder is typically made into an aqueous slurry and applied to the larger particles or large scale reinforcing structures, such as honeycomb or other porous bodies. These monolithic structures are made from a wide variety of materials including metallic mesh and ceramic materials, such as, sillimanite, petalite, cordierite, mullite, zircon, zircon mullite, spodumene, alumina and alumina-titanate. As set forth above, the invention is particularly well suited for use with monoliths that include metal as a primary component, especially when the metal is located at the surface of the monolith where it interfaces with the ceramic support. The procedures for applying the catalytic powder to the macro-sized or monolith carrier are all well known in the art and typically involve applying an aqueous slurry of the ceramic catalyst particles to the monolith by dipping or spraying.

Examples of practice are as follows:

EXAMPLE 1

400 grams of pure (99.5 weight percent) gamma-alumina powder is provided that has a surface area of about 150 square meters per gram. A ½ monolayer of titanium is applied to the powder surface using atomic titanium vapor deposition to provide a modified alumina. If desired, the titanium dopant may be applied by adding an organometallic complex containing titanium (either in the vapor phase or in an organic solvent) followed by reduction with hydrogen. The organo metallic should be a low-valent metal complex that is easily reduced. For example, carbonyl and hydride complexes of the early transition metal are suitable.

Once the ½ monolayer of titanium metal has been applied to the surface of the alumina, the modified alumina is then mixed with 280 mls of an aqueous platinum amine hydroxide or platinum chloride solution that contains about 2.1 grams platinum. Then, about 30 mls of glacial acetic acid is added. Essentially all of the liquids are absorbed by the alumina with the resulting catalytic powder having 90 percent particle sizes below 40 microns with most particles being around 20 microns. The platinum containing alumina is then formed into a slurry by combining it with acetic acid and water. The slurry is then applied to a metallic mesh or ribbon monolith by dipping the metallic monolith into the slurry. After excess slurry has been removed, the monolith is dried and calcined at 500° C. Based on density functional theory calculations, the catalyst is expected to have a prolonged lifetime as opposed to the same catalyst that does not have an adhesive agent.

EXAMPLE 2

One hundred grams of gamma alumina powder that has been stabilized with 0.8% barium oxide is doped with titanium and zirconium in the same manner as Example 1 to provide modified alumina particles that have a ¼ monolayer of titanium and ¼ monolayer of zirconium on the surface of the particles. The modified particles are then impregnated with an aqueous palladium chloride solution containing 0.5 grams of palladium. 3 mls of a dilute (10%) solution of $N_2H_4$ is added to the wet powder to reduce the palladium species to metal particles and fix them on the alumina particles. The palladium containing alumina is then formed into a slurry by combining it with water and acetic acid. The slurry is then applied to a monolithic support of cordierite by dipping the monolith in the slurry. After excess slurry has been removed, the monolith is dried and calcined at 500° C. Based on density functional theory calculations, the catalyst is expected to have a prolonged lifetime as opposed to the same catalyst that does not have an adhesive agent.

EXAMPLE 3

One hundred grams of gamma alumina powder is doped with titanium, zirconium and yttrium in the same manner as Example 1 to provide modified alumina particles that have a ¼ monolayer of titanium, ¼ monolayer of zirconium and ¼ monolayer of yttrium on the surface of the particles. The modified particles are then impregnated with an aqueous nickel chloride solution containing 0.5 grams of nickel. 3 mls of a dilute (10%) solution of $N_2H_4$ is added to the wet powder to reduce the nickel species to metal particles and fix them on the alumina particles. The nickel containing alumina is then formed into a slurry by combining it with water and acetic acid. The slurry is then applied to a metallic mesh monolithic support by dipping the monolith in the slurry. After excess slurry has been removed, the monolith is dried and calcined at 500° C. Based on density functional theory calculations, the catalyst is expected to have a prolonged lifetime as opposed to the same catalyst that does not have an adhesive agent.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A catalytic system comprising:
   a ceramic support comprising alumina, said ceramic support including a surface that comprises a monolayer of an adhesive agent provided on said surface, said adhesive agent comprising at least one of titanium, zirconium, scandium, hafnium, lanthanum, and yttrium metals; and
   a plurality of metal catalyst particles attached to the surface of said ceramic support wherein said monolayer of the adhesive agent provides increased adhesion between the ceramic support and the plurality of metal catalyst particles.

2. A catalytic system according to claim 1 wherein said ceramic support is in the shape of a particle.

3. A catalytic system according to claim 1 wherein said metal catalyst particles are selected from the group consisting of nickel, palladium and platinum.

4. A catalytic system according to claim 1 wherein said adhesive agent is in the form of a ¼ to ¾ to monolayer on said surface.

5. A catalytic system according to claim 1 wherein said adhesive agent is applied to the surface of the ceramic support as reduced metals.

6. A catalytic system according to claim 1 wherein two or more adhesive agents are present at the surface of said support.

7. A catalytic system according to claim 1 wherein said adhesive agent is in the form of a ½ monolayer on said surface.

8. A catalytic system according to claim 1 wherein the adhesive agent is applied to the surface of the ceramic support as suboxides.

9. A catalytic system according to claim 1 wherein the ceramic support further comprising a second surface on which a monolayer of said adhesive agent is provided; and
   the catalytic system further comprising a monolith attached to said second surface of the ceramic support.

10. A catalytic system according to claim 9, the monolith having a surface comprising metal on which said second surface of the ceramic support is attached.

11. A catalytic system according to claim 9 wherein the monolayer of the adhesive agent on said second surface of the ceramic support is in the form of a ¼ to ¾ monolayer.

12. A catalytic system according to claim 9 wherein the monolayer of the adhesive agent on said second surface of the ceramic support is in the form of a ½ monolayer.

13. A catalytic system according to claim 9 wherein the adhesive agent is applied to the second surface of the ceramic support as reduced metals.

14. A catalytic system according to claim 9 wherein the adhesive agent is applied to the second surface of the ceramic support as suboxides.

15. A method for making a catalytic system comprising the steps of:
   providing a ceramic support comprising alumina, said ceramic support including a surface that is capable of supporting a monolayer of an adhesive agent provided on said surface;
   treating said surface with an adhesive agent to provide a modified surface that is doped with a monolayer of said adhesive agent, said adhesive agent comprising at least one of titanium, zirconium, scandium, hafnium, lanthanum, and yttrium metals; and
   attaching a plurality of metal catalyst particles to the modified surface of said ceramic support whereby said monolayer of the adhesive agent provides increased adhesion between the ceramic support and the plurality of metal catalyst particles.

16. The method of claim 15 wherein said ceramic support is in the shape of a particle.

17. The method of claim 15 wherein said metal catalyst particles are selected from the group consisting of nickel, palladium and platinum.

18. The method of claim 15 wherein said adhesive agent is in the form of ⁄1;4 to ⁄3;4 monolayer on said surface.

19. The method of claim 15 wherein two or more adhesive agents are present at the surface of said support.

20. The method of claim 15 that includes the additional step of attaching said supported metal catalyst to a metallic monolith structure.

21. The method of claim 16 that includes the additional step of attaching said supported metal catalyst to a metallic monolith structure.

* * * * *

UNITED STATES PATENT AND TRADEMARK OFFICE
CERTIFICATE OF CORRECTION

PATENT NO. : 7,504,355 B2
APPLICATION NO. : 10/518129
DATED : March 17, 2009
INVENTOR(S) : Emily A. Carter and Emily A. Jarvis Page 1 of 1

It is certified that error appears in the above-identified patent and that said Letters Patent is hereby corrected as shown below:

Col. 8, claim 18, lines 53-54 - Replace with:

"The method of claim 15 wherein said adhesive agent is in the form of 1/4 to 3/4 monolayer on said surface."

Signed and Sealed this

Twenty-first Day of April, 2009

JOHN DOLL
*Acting Director of the United States Patent and Trademark Office*